Figure 1:
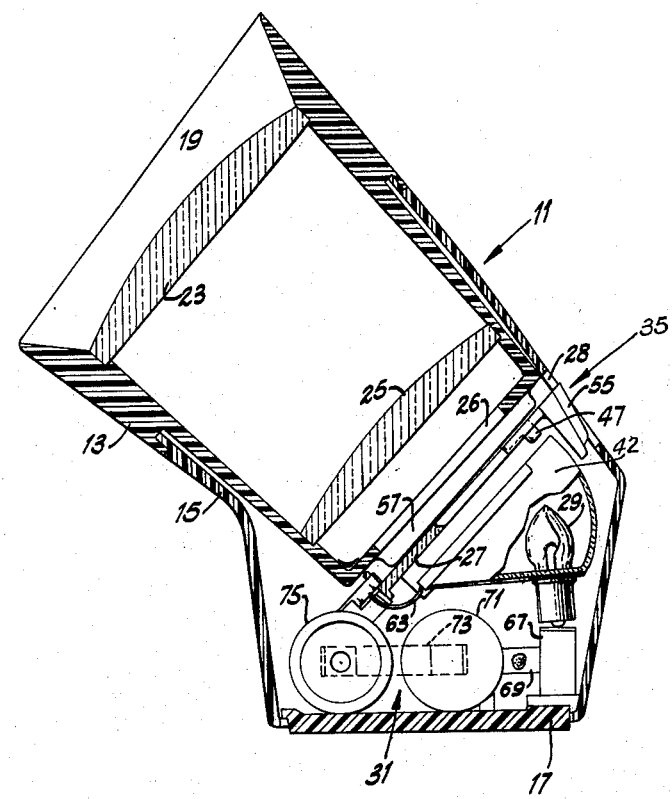

Oct. 20, 1964   J. B. CLARKSON ET AL   3,153,293
TRANSPARENCY VIEWER
Filed Feb. 27, 1959   4 Sheets-Sheet 1

INVENTORS
Jack B. Clarkson
Charles D. Seekings
BY
Robert E. Strauser
ATTORNEY

Oct. 20, 1964    J. B. CLARKSON ET AL    3,153,293
TRANSPARENCY VIEWER

Filed Feb. 27, 1959    4 Sheets-Sheet 2

INVENTORS
Jack B. Clarkson
Charles D. Seekings
BY
Robert E. Strausser
ATTORNEY

Oct. 20, 1964 J. B. CLARKSON ET AL 3,153,293
TRANSPARENCY VIEWER
Filed Feb. 27, 1959 4 Sheets-Sheet 3

INVENTORS
Jack B. Clarkson
Charles D. Seekings
BY
Robert E. Strausser
ATTORNEY

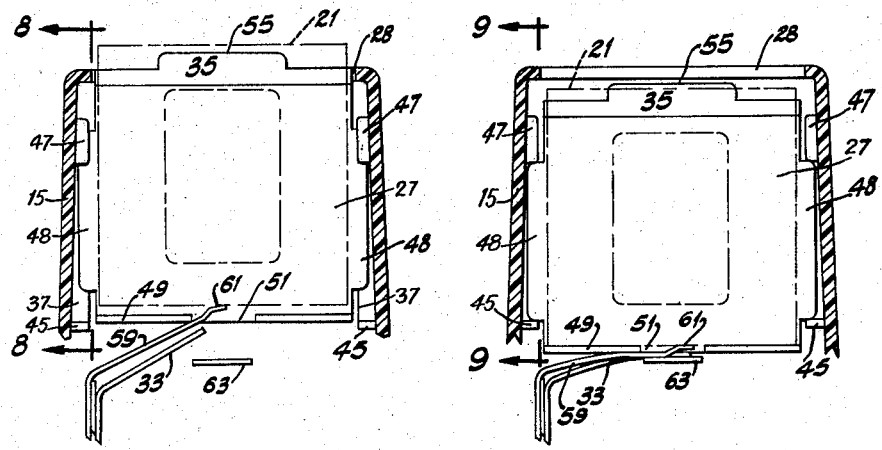
Fig. 6   Fig. 7
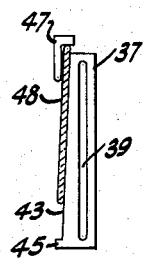   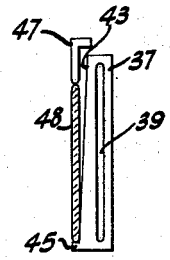
Fig. 8   Fig. 9
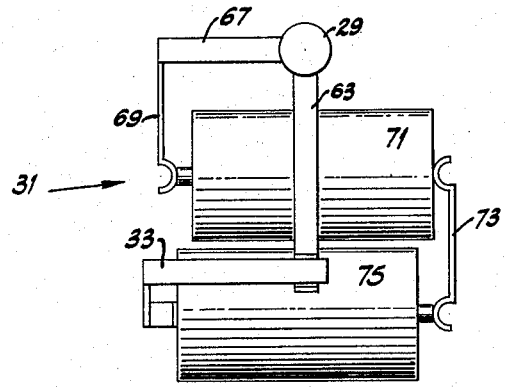
Fig. 10
INVENTORS
Jack B. Clarkson
Charles D. Seekings
BY
Robert E. Strausser
ATTORNEY

United States Patent Office 3,153,293
Patented Oct. 20, 1964

3,153,293
TRANSPARENCY VIEWER
Jack B. Clarkson, Warren, and Charles D. Seekings, Youngsville, Pa., assignors, by mesne assignments, to Argus Incorporated, a corporation of Delaware
Filed Feb. 27, 1959, Ser. No. 795,992
16 Claims. (Cl. 40—63)

This invention relates to viewers of the type normally used to illuminate and magnify photographic slide transparency images.

Transparency viewers generally comprise a slot for receiving and positioning the transparency slide located intermediate a diffused light source and an optical magnification lens or lens system. An electrical lighting circuit with a manually operable switch generally provides means for energizing the light source and illuminating the transparency after it has been placed in the viewing position. The switch may be actuated by the operator directly or by the transparency slide upon its insertion into the slot. A loading spring is conventionally provided at the bottom of the slot so that the transparency slide is continuously urged away from the viewing position. Therefor, upon insertion of the transparency slide into the slot, the operator must press inwardly on the transparency slide and hold it in this position for viewing. The biasing spring may also serve as the movable contact of the switch.

The transparency viewer described above has a number of disadvantages. For example, the transparency slide undergoes excessive wear when it is used to actuate the switch and to contact the loading spring. Also, the operator must continuously press against the fragile transparency slide to move it to the viewing position and to hold it there as long as viewing is desired. In addition, these viewer structures are generally relatively complex and costly to fabricate and assemble.

Accordingly, it is an object of this invention to reduce the foregoing disadvantages by simplifying and ruggedizing the viewer.

A further object of the invention is to reduce wear of the transparency slide in addition to allowing the transparency slide to be locked in the viewing position at the discretion of the operator.

The foregoing objects are achieved in one aspect of the invention by the provision of a viewer utilizing a transparency slide carrier which serves to support the transparency slide and to actuate the lighting circuit. A biasing member operates on the carrier to hold the upper edge of the transparency slide above the viewer housing in the load and unload position and to lower the transparency slide into the viewing position upon movement of the carrier. A locking device is also provided for maintaining the transparency slide in the viewing position when it is desired to do so.

Figure 2:
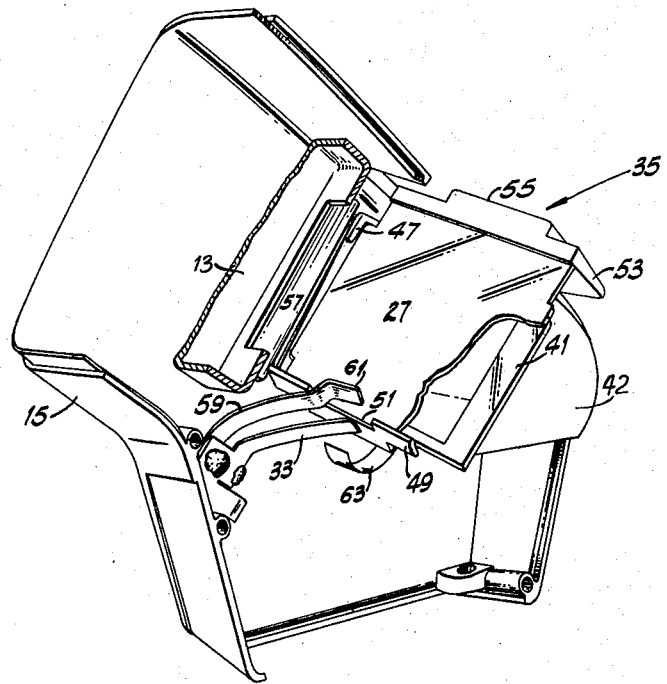
Figure 3:
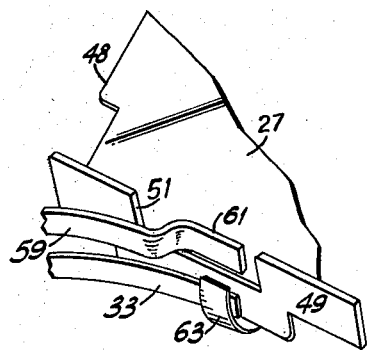
Figure 4:
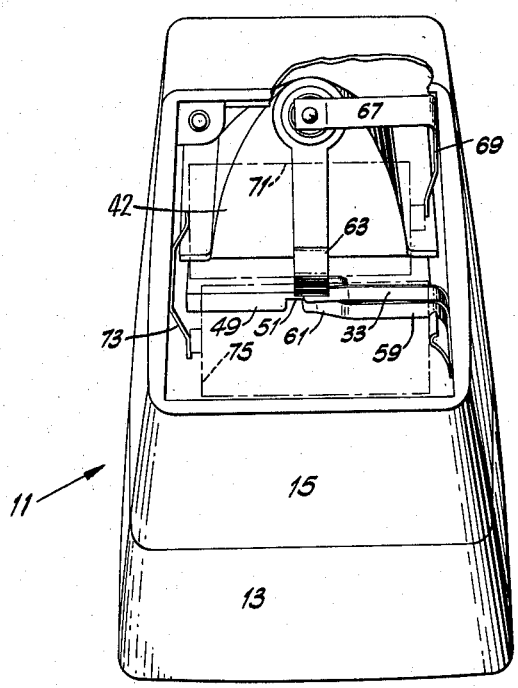
Figure 5:
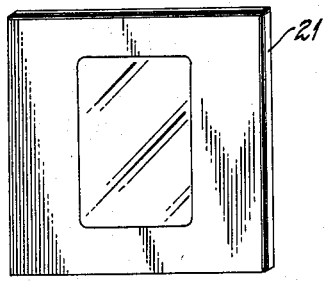

For a better understanding of the invention reference is made to the accompanying drawings in which:

FIG. 1 is a sectional view of the transparency viewer;
FIG. 2 is a partially cut-away perspective view illustrating primarily the transparency slide carrier member;
FIG. 3 illustrates, in perspective, the means utilized to provide movement for the transparency slide carrier and for energizing the electrical circuit;
FIG. 4 is a partially cut-away perspective view illustrating the electrical connections for the viewer;
FIG. 5 is a perspective view of a conventional transparency slide;
FIGS. 6 and 7 illustrate the manner in which the carrier reciprocates from the loading to the viewing position;
FIGS. 8 and 9 show the manner in which the carrier is operated to provide locking in the viewing position; and FIG. 10 shows the essential elements of the electrical circuit employed with the viewer.

Referring to the drawings, the viewer 11 comprises a lens housing 13 interlocked with viewer housing 15 at one end and closed with a base 17 at the other end. These exterior pieces are preferably formed of plastic and may be attached to one another in any conventional manner such as by plastic fusion, glue joints or mechanical means like screws or clips. The viewing hood 19 and the optical system to be hereafter described are positioned relative to base 17 so that the operator can assume a normal viewing position when the base is horizontal.

The optical system for illuminating and magnifying the image formed on transparency slide 21 when viewed from hood 19 comprises spaced lenses 23 and 25, light diffusion plate 27 and the light source or lamp 29. During operation, transparency slide 21 lies within slot 28 located intermediate diffusion plate 27 and lens 25. Opening 26 is provided in housing 13 to allow passage of light to the lenses. An electrical lighting circuit 31 employing a switch arm 33, which is actuated by transparency slide carrier 35, functions to illuminate lamp 29 when the carrier reaches the viewing position within slot 28.

Molded or formed in the opposite sides of viewer housing 15 are brackets 37 each having a recess 39 therein. The wings 41 of light hood 42 extend into the recess to provide support for the hood. One side of the bracket forms a carrier 35 slide surface 43 terminating in a stop 45. Spaced from the upper edge of brackets 37 are substantially L-shaped ledges 47 which have the dual function of preventing removal of carrier 35 from slot 28 and of providing locking means for the carrier when it is in the viewing position.

Carrier 35 comprises light diffusion plate 27 formed with guide extensions 48 which slide along surfaces 43. The bottom of carrier 35 has a transparency slide retainer or shelf 49 extending from diffusion plate 27 substantially perpendicular thereto. The central part of the shelf has a cut-out portion 51. The upper end of the diffusion plate is provided with a frame plate 53 and a centrally located push platform 55 which the operator presses against to move carrier 35 into the viewing position. Elongated slot 28, into which the transparency slide 21 is placed, is formed on one side by the carrier and on the other side by the back frame of housing 13 surrounding opening 26. This housing is positioned with flaps 57 in contact with ledges 47.

Mounted on the side of housing 15 is a biasing means or leaf spring 59 extending outwardly to contact the edge of cut-out 51. The end of spring 59 passes through the cut-out and is formed as a lift finger 61. The resiliency of the spring is such that its contact with the edge of the cut-out imparts a continuous upwardly directed bias upon carrier 35.

Also connected to the side of housing 15 and insulated from spring 59 is switch arm 33, which is forced into engagement with switch contact 63 by the bottom of shelf 49 when carrier 35 is pressed into the viewing position. The resiliency of arm 33 need only be sufficient to cause it to spring back from the switch contact position when carrier 35 reciprocates upwardly under the influence of spring 59.

It can be seen from the drawings that transparency slide 21, which is loaded into slot 28, is moved from the loading position FIG. 6, to the viewing position, FIG. 7, by means of carrier 35 and lift finger 61. When the transparency slide is placed into the slot, the lower edge thereof rests on the top of lift finger 61 in spaced relationship from shelf 49. This allows finger access by the operator to transparency slide 21 since the upper surface thereof is above frame plate 53. When the operator presses against platform 55, carrier 35 moves downwardly against the pressure exerted by spring 59 on the edge of cut-out 51. This carrier movement causes lift finger 61 to bend and gradually lower or carry the transparency slide into the viewing position on retainer or shelf 49, FIG. 7. The bottom of the shelf picks up switch arm 33 during the descending part of its reciprocatory movement and forces it into contact with switch contact 63, thereby energizing lamp 29.

After the viewing of the transparency has been completed, the finger pressure on platform 55 is released and spring 59 forces carrier 35 back to the loading position, FIG. 6, and also lifts the transparency slide above shelf 49 so that the upper transparency slide edge is accessible to the operator above frame plate 53. The upward movement of the carrier also allows switch arm 33 to flex away from contact 63.

If it is desired to view the transparency for a period of time, the carrier 35 may be moved from the loading position shown in FIG. 8 to the viewing position of FIG. 9. The carrier is then rotated slightly forward until the top of extensions 48 catch under ledges 47, FIG. 9. The carrier cannot rotate beyond the ledge since the extensions then abut flaps 57. To release the carrier, it need only be rotated backwardly until it clears ledge 47, at which time the force of spring 59 returns the carrier to the loading position, FIG. 8. The rotative movement is provided by pressure exerted on platform 55.

The electrical circut for energizing lamp 29 is shown most clearly in FIGS. 4 and 10. The center of the lamp is connected to straps 67 and 69, through battery 71, strap 73, battery 75 and to switch arm 33. The shell of the lamp is coupled to switch contact 63. When carrier 35 forces arm 33 into engagement with contact 63, the lamp is energized.

A transparency viewer constructed in accordance with the invention is rugged and relieves wear and tear on the photographic slide transparencies. The operation of carrier 35 and spring 59 provides unique means for supporting the transparency slide in an accessible position for loading and removal and for carrying the transparency slide to the viewing position. The locking feature of ledges 47 on extensions 48 allows maintenance of the transparency slide in the viewing position without necessitating continuous pressure on carrier 35.

Although one embodiment of the invention has been shown and described, it will be apparent to those skilled in the art that various changes and modifications may be made therein without departing from the scope of the invention as defined by the appended claims.

What is claimed is:

1. A transparency viewer comprising a viewing lens, a light source, a transparency carrier having a transparency retainer position thereon, said carrier being mounted between the lens and light source for reciprocation between a transparency loading position and a viewing position, and biasing means contacting the carrier and formed to continuously urge said carrier toward the loading position, said biasing means having a lift operable to spacedly support the transparency from said retainer portion in the loading position and upon movement of said carrier against the opposing force of said biasing means to carry the transparency to said retainer portion during movement of the carrier to the viewing position.

2. A transparency viewer comprising a viewing lens, a light source, a transparency carrier formed to provide a shelf at the bottom thereof for supporting a transparency, said carrier being mounted between the lens and light source for reciprocation between an upper transparency loading position and a lower viewing position, and a spring contacting the shelf formed to continuously urge said carrier toward the loading position, said spring having a lift finger operable to spacedly support the transparency from said shelf in the loading position and upon movement of said carrier against the opposing force of the spring to carry the transparency substantially to said shelf during the downward movement of the carrier to the viewing position.

3. A transparency viewer comprising a viewing lens, a light source, a transparency carrier formed to provide a shelf at the bottom thereof for supporting a transparency, said shelf having a cut-out, said carrier being mounted between the lens and light source for reciprocation between an upper transparency loading position and a lower viewing position, and a spring contacting the bottom of the shelf and formed to continuously urge said carrier toward the loading position, said spring having a lift finger passing upwardly through said cut-out operable to spacedly support the transparency from said shelf in the loading position and upon movement of said carrier against the opposing force of said biasing means to carry the transparency substantially to said shelf during the downward movement of the carrier to the viewing position.

4. A transparency viewer comprising a viewing lens, a light source, a transparency carrier having a light diffusion plate and a transparency retainer portion, said carrier being mounted between the lens and light source for reciprocation between a transparency loading position and a viewing position, biasing means contacting the carrier retainer portion formed to continuously urge said carrier toward the loading position, said biasing means having a lift operable to spacedly support the transparency from said retainer portion in the loading position and upon movement of said carrier against the opposing force of said biasing means to carry the transparency substantially to said retainer portion during movement of the carrier to the viewing position, and an electrical circuit for energizing said light source when the carrier is in the viewing position.

5. A transparency vewer comprising a housing having a transparency loading slot formed therein, a viewing lens, a light source, and a transparency carrier forming a continuation of one side of said slot positioned intermediate the light source and lens, said carrier having a frame plate located adjacent the housing slot and being mounted for reciprocation between a transparency loading position and a viewing position, and biasing means for continuously urging said carrier toward the loading position, for supporting a portion of the transparency above said plate at the loading position, and upon movement of said carrier against the opposing force of said biasing means for carrying the transparency to the viewing position whereat the transparency edge is substantially flush with said frame plate.

6. In a transparency viewer including a boxlike member having a light bulb and an electric circuit arranged to connect the light bulb to a source of electricity; a combined transparency receiving and ejecting frame and circuit completing switch comprising a pair of spaced apart transparency guide tracks for slidably receiving the transparency therebetween, said guide tracks leading from a transparency receiving slot in one side of the boxlike member, a leaf spring mounted opposite said transparency receiving slot and yieldably resisting the full entry of the transparency through the slot and arranged to at least partially eject the transparency when manual holding pressure thereon is released, a spring switch in said electric circuit, and operating means for said spring switch located in said boxlike member adjacent said transparency receiving slot whereby when the transparency is manually depressed to viewing position, said operating means is simultaneously manually depressed to operating position, and when manual pressure is released on said transparency, it is simultaneously released on said switch operating means, said switch operating means being located in the path of the finger depressing the transparency.

7. In a transparency viewer including a boxlike member, a light bulb and an electric circuit arranged to connect the light bulb to a source of electricity; a combined transparency receiving and ejecting frame and circuit completing switch comprising a pair of spaced apart transparency guide tracks for slidably receiving the transparency therebetween, said guide tracks leading from a transparency receiving slot in one side of the boxlike member, a spring mounted in the side of the boxlike member opposite said transparency receiving slot and yieldably resisting the full entry of the transparency through the slot and arranged to at least partially eject the transparency when manual holding pressure thereon is released, a circuit completing switch, and yieldably resisting switch operating means located in said boxlike member and extending therethrough closely adjacent said transparency receiving slot whereby said switch operating means is in the path of the human operating finger when the transparency is manually depressed and held through said slot against said ejecting spring for simultaneous operation therewith.

8. In a picture viewer including boxlike member having a light bulb, and an electric circuit arranged to connect the light bulb to a source of electricity: a combined picture receiving and ejecting frame and circuit completing switch comprising a pair of spaced apart picture guide tracks for slidably receiving the picture therebetween, said guide tracks leading from a picture receiving slot in one side of the boxlike member, spring means yieldably resisting the full entry of the picture through the slot and arranged to at least partially eject the picture when manual holding pressure thereon is released, a circuit completing switch and switch operating means normally in the path of the human finger pressing the picture against said ejecting spring, whereby the circuit is completed to light the bulb only while manual pressure is maintained holding the picture in viewing position.

9. A transparency viewing device comprising a casing having a transverse slot in one wall through which a transparency slide may be inserted and withdrawn, illuminating means mounted in said casing and comprising a light bulb, a battery, and conductive circuit means between said bulb and said battery and including a spring contact switch, slide guiding means in said casing to hold an inserted transparency slide transversely across said casing, a light diffusing plate, plate guiding means parallel to said slide guiding means and closely adjacent thereto to hold said plate for limited movement in the direction of movement of said slide, a portion of said plate projecting through said casing wall closely adjacent said slot, an ejector spring in said casing opposite said slot in position to be engaged by the edge of an inserted slide, said ejector spring also engaging an edge of said plate to hold said plate in an elevated position, said ejector spring normally holding the upper edge of an inserted slide above the upper edge of said plate whereby the slide may be grasped to effect its withdrawal from the casing, and means on said plate to depress and close said spring contact switch when said plate is manually depressed against the force of said ejector spring.

10. A transparency viewing device comprising a casing having a transverse slot in its upper wall through which a transparency slide may be inserted and withdrawn, illuminating means mounted in one end of said casing and comprising a light bulb, a battery, and conductive circuit means between said bulb and said battery and including a spring contact switch, slide guiding means in said casing to hold an inserted transparency slide transversely across said casing, a light diffusing plate in said casing, plate guiding means parallel to said slide guiding means and closely adjacent thereto to hold said plate for limited movement in the direction of movement of said slide, a portion of the upper edge of said plate projecting through said upper wall of the casing closely adjacent said slot, an ejector spring in said casing opposite said slot in position to be engaged by the lower edge of an inserted slide, said ejector spring also engaging the lower edge of said plate and holding said plate in an elevated position, said ejector spring normally holding the upper edge of an inserted slide above the upper edge of said plate whereby the slide may be grasped to effect its withdrawal from the casing, and means on said plate to depress and close said spring contact switch when said plate is manually depressed against the force of said ejector spring.

11. A transparency slide viewer comprising a casing having a slot in its upper wall and guiding means adjacent said slot whereby a transparency slide may be inserted and withdrawn vertically through said slot and when inserted will be maintained transversely across said casing, a vertically movable light diffusing plate mounted in said casing closely adjacent and parallel to said slide guiding means, the upper edge of said plate projecting slightly above said casing through said slot, an ejector spring normally holding said plate in an elevated position and normally holding an inserted slide in an elevated position with its upper edge exposed above the upper edge of said plate whereby it may be grasped for withdrawal, an illuminating bulb mounted in said casing behind said light diffusing plate, means in said casing to energize said bulb and including a spring contact switch, and means on said diffusing plate to engage and close said spring contact switch when said diffusing plate is depressed against the force of said ejector spring, said diffusing plate being so arranged with respect to said slot that a finger engaging the upper edge of an inserted slide may function not only to depress said slide but also to depress said plate.

12. A transparency slide viewer comprising a casing having a slot in its upper wall and guiding means adjacent said slot whereby a transparency slide may be inserted and withdrawn vertically through said slot and when inserted will be maintained transversely across said casing, a vertically movable light diffusing plate mounted in said casing closely adjacent and parallel to said slide guiding means, a portion of the upper edge of said plate projecting slightly above said casing through said upper wall, an ejector spring normally holding said plate and an inserted slide in elevated positions with the upper edge of said slide projecting above the upper edge of said plate whereby the slide may be grasped for withdrawal, an illuminating bulb mounted in said casing behind said light diffusing plate, means in said casing to energize said bulb and including a spring contact switch, and means movable with said diffusing plate to engage and close said spring contact switch when said diffusing plate is depressed against the force of said ejector spring, said diffusing plate being so arranged with respect to said slot that a finger engaging the upper edge of an inserted slide may function not only to depress said slide but also to depress said plate.

13. A transparency slide viewer comprising a casing having a slot in its upper wall and guiding means adjacent said slot whereby a transparency slide may be inserted and withdrawn vertically through said slot and when inserted will be maintained transversely across said casing, a vertically movable, rigid member mounted in said casing closely adjacent and parallel to said slide guiding means, a portion of said upper wall of the casing having an opening therein through which a portion of said member projects, an ejector spring engageable by an inserted slide and engaging said member to hold the slide and member in elevated positions with the upper edge of said slide projecting above the upper wall of said viewer whereby the slide may be grasped for withdrawal, an illuminating bulb mounted in said casing, means in said casing to energize said bulb and including a switch, and means on said member to close said switch when said member is depressed against the force of said ejector spring, said portion of said member being so arranged with respect to said slot that the tip of a finger engaging the upper edge of an inserted slide in order to depress the same against the force of said ejector spring overlies said portion of the member so that the same finger tip may also depress said member to close said switch.

14. A transparency viewing device comprising a casing having a transverse slot in one wall through which a transparency slide may be inserted and withdrawn, illuminating means mounted in said casing and comprising a light bulb, a battery, and conductive circuit means between said bulb and said battery and including a spring contact switch, slide guiding means in said casing to hold an inserted transparency slide transversely across said casing, a light diffusing plate, plate guiding means parallel to said slide guiding means and closely adjacent thereto to hold said plate for limited movement in the direction of movement of said slide, a portion of said plate projecting through said casing wall closely adjacent said slot, an ejector spring in said casing opposite said slot in position to be engaged by the edge of an inserted slide, said ejector spring normally holding the upper edge of an inserted slide above the upper edge of said plate whereby the slide may be grasped to effect its withdrawal from the casing, and means on said plate to depress and close said spring contact switch when said plate is manually depressed.

15. A transparency viewing device comprising a casing having a transverse slot in one wall through which a transparency slide may be inserted and withdrawn, illuminating means mounted in said casing and comprising a light bulb, a battery, and conductive circuit means between said bulb and said battery and including a spring contact switch, slide guiding means in said casing to hold an inserted transparency slide transversely across said casing, a light diffusing plate, plate guiding means parallel to said slide guiding means and closely adjacent thereto to hold said plate for limited movement in the direction of movement of said slide, a portion of said plate projecting through said casing wall closely adjacent said slot, an ejector spring in said casing opposite said slot in position to be engaged by the edge of an inserted slide, said ejector spring normally holding the upper edge of an inserted slide above the upper edge of said plate whereby the slide may be grasped to effect its withdrawal from the casing, and means on said plate to depress and close said spring contact switch when said plate is manually depressed, said device including spring means for normally holding said plate in an elevated position.

16. A transparency viewing device comprising a casing having a transverse slot in one wall through which a transparency slide may be inserted and withdrawn, illuminating means mounted in said casing and comprising a light bulb, a battery, and conductive circuit means between said bulb and said battery and including a spring contact switch, slide guiding means in said casing to hold an inserted transparency slide transversely across said casing, a light diffusing plate, plate guiding means parallel to said slide guiding means and closely adjacent thereto to hold said plate for limited movement in the direction of movement of said slide and for limited tilting movement normal to the slide, a portion of said plate projecting through said casing wall closely adjacent said slot, an ejector spring in said casing opposite said slot in position to be engaged by the edge of an inserted slide, said ejector spring normally holding the upper edge of an inserted slide above the upper edge of said plate whereby the slide may be grasped to effect its withdrawal from the casing, and means on said plate to depress and close said spring contact switch when said plate is manually depressed, and a ledge associated with the plate guiding means and engaged by the plate when the plate is manually depressed to close said spring contact switch and is manually tilted normal to the slide for locking the plate in its depressed position and maintaining the spring contact switch closed.

References Cited in the file of this patent
UNITED STATES PATENTS

| | | |
|---|---|---|
| 1,712,854 | Thonet | May 14, 1929 |
| 2,349,013 | Sparling | May 16, 1944 |
| 2,520,432 | Robertson | Aug. 29, 1950 |
| 2,666,360 | Collins | Jan. 19, 1954 |
| 2,720,045 | Miller | Oct. 11, 1955 |
| 2,892,274 | Afton | June 30, 1959 |